3,271,179
METHOD FOR THE MANUFACTURE OF AN OPTICAL FILTER
Hugh R. Smith, Jr., Piedmont, Calif., assignor to Temescal Metallurgical Corporation, Berkeley, Calif., a corporation of California
Filed Sept. 24, 1962, Ser. No. 225,555
4 Claims. (Cl. 117—33.3)

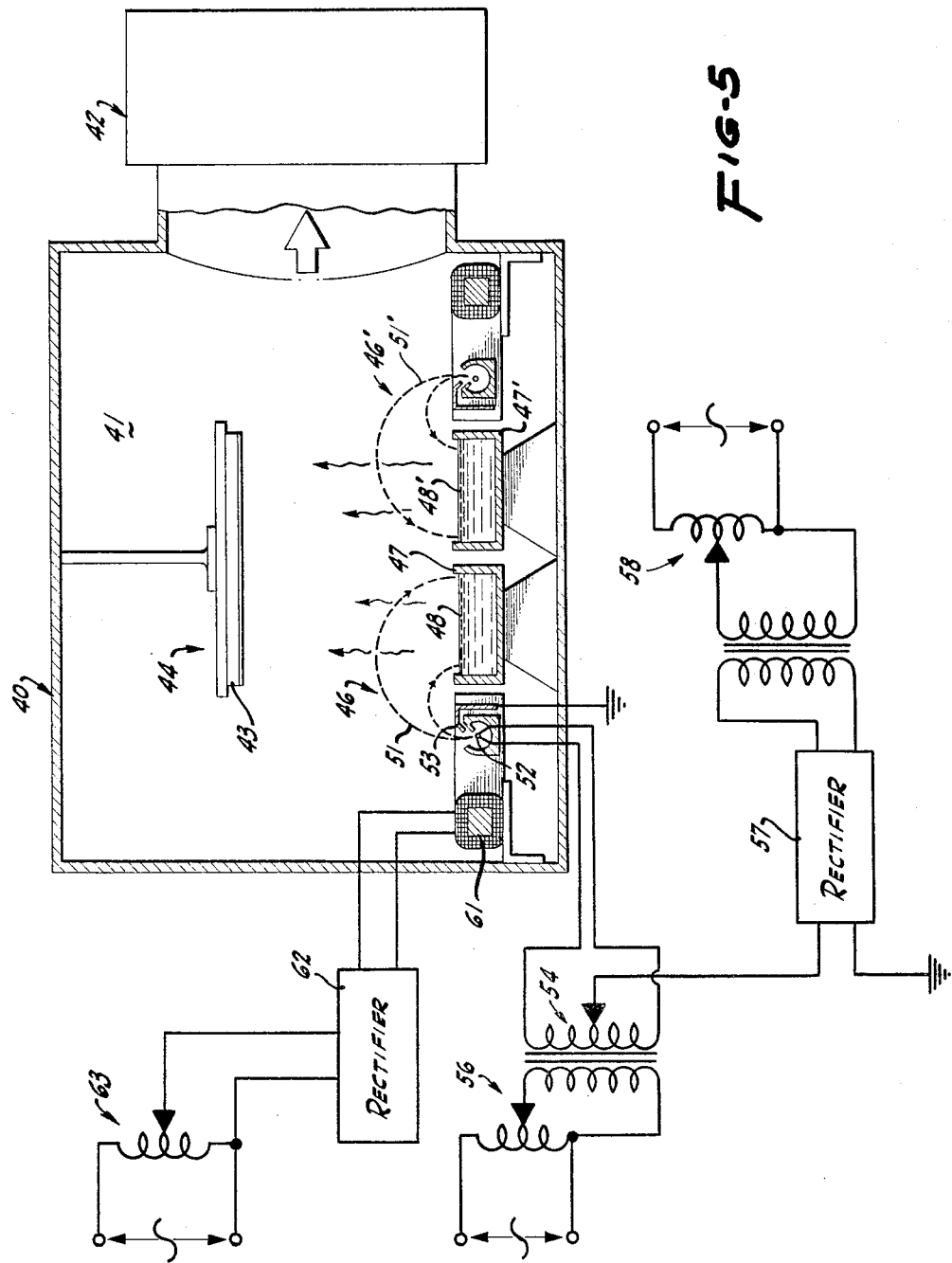

This invention relates to improvements in coated lenses and other articles coated to provide desired light-transmitting or light-reflecting properties, particularly to graded thin-film filters having a coating possessing continuous gradients or gradual changes in refractive index within the coating; to methods for casting said articles; and to improved coating apparatus.

Conventional, thin-film, optical filters are made by depositing different chemical compounds, one after another, in discrete layers upon the surface of a lens or other optical elements serving as a substrate. The light-transmission and light-reflection characteristics of the filter are functions of wave length, which can be calculated by finding solutions of Maxwell's equations that satisfy the boundary conditions imposed by the refractive indexes, thicknesses, number, and arrangement of layers in the coating, and the refractive indexes of the substrate and the ambient medium. Such calculations are often made with an electronic computer. In simple terms, assuming multiple discrete layer each composed of a single chemical compound having a fixed refractive index, light is partly transmitted and partly reflected at each interface between dielectrics of different refractive indices, resulting in multiple internal reflections and interferences between reflected rays and other reflected or non-reflected rays, the interference being constructive at some wave lengths and destructive at others. For a more extended treatment of this subject, reference may be made to the "Handbook of Physics," McGraw-Hill Book Company, 1958, pages 6–99 to 6–108.

The art of thin-film filter design in existence prior to this invention consisted chiefly of selecting two or more chemical compounds to be deposited on the substrate, and specifying the thicknesses, number, and arrangement of discrete layers of these compounds to give the desired, light-transmitting or light-reflecting characteristics. The filter characteristics that can be attained by this conventional design procedure are severely limited, and the complexity of the filter structures for a given purpose is large because of the small number of choices available to the designer. Only a limited number of chemical compounds have all of the characteristics desired for optical coatings, such as; easy fabrication into uniform, thin, transparent films; good adherence to the substrate and adjacent layers; chemical and physical stability; resistance to abrasions; and the like. The availability of a small number of suitable compounds provides only a small number of available refractive indexes. Furthermore, restriction of the filter to discrete layers, each composed of a single compound of fixed refractive index, is a severe design limitation.

The present invention expands the field of thin-film optical filter design by recognizing and overcoming the limitations imposed by prior design procedures and fabrication processes. It makes possible the design and fabrication of more selective and narrower band-width optical filters, and the achievement of more complex transmission or reflection versus frequency characteristics than were practicable heretofore; and it makes possible simplifications in filter structure, which leads to easier fabrication and lower costs. These benefits accrue from the better designs made possible by putting a greater range of choices of design parameters at the disposal of the designer.

Briefly, in accordance with this invention, each layer of the filter may be formed of a mixture of compounds deposited simultaneously by vacuum evaporation. This may be accomplished by two or more vapor sources arranged side-by-side in a vacuum chamber, each source vaporizing a different substance at a controlled, variable rate. The vapors from the several sources mix and condense at the same time upon the same parts of the substrate; thus, the deposited coating is a mixture of the two or more substances, deposited in proportions controlled by the relative vapor production rates of the several vapor sources. As a rule, the refractive index of the so-deposited coating may have any value between the refractive indexes of the constituent compounds, increasing as the proportion of higher-index compound is increased, and vice-versa. Hence, the designer is no longer limited to a few available refractive indexes but instead may choose from a wide range of refractive indexes. Furthermore, it is no longer necessary to divide the coating into discrete layers of fixed refractive index. By gradually varying the relative amounts of vapor produced by the vapor sources, the proportions of the constituent chemical compounds in the coating are varied gradually. Thus, a gradual transition is provided between a region predominantly comprised of one compound with a first index of refraction and a region predominantly comprised of another compound having a different index of refraction. There is no abrupt junction or interface between layers in such a coating, and the refractive index changes gradually from region to region, providing a continuous gradient instead of abrupt steps or discontinuities in the function describing the value of the refractive index versus distance through the thickness of the coating. In a coating of this type, it is more difficult to visualize the interference between multiply reflected light rays; nevertheless, the light-transmission and light-reflection characteristics are functions of frequency determined by the variations in refractive index; and these functions can be calculated from Maxwell's equations and the boundary conditions imposed by the filter structure. In fact, the possible choices available to the designer for sophisticated filter designs are greatly increased, whereby complex filter characteristics that were difficult or impossible to achieve in practice heretofore are now readily attainable.

The vapor sources preferred for this invention employ electron bombardment heating to vaporize the materials to be deposited upon the substrate. By controlling the electrical energy supplied to the electron beams that bombard the evaporating materials, the vaporization rate of each material is precisely controlled, and can be varied rapidly over a wide range of values. The proportions of the materials deposited upon the substrate at each instant are subject to precise control and variation at any reasonable rate that may be desired. In the high vacuum provided, vapor molecules travel unimpeded from the vapor source to the element being coated, and become part of the coating at their point of impact; thus, the several constituent compounds deposited at the same time are intimately co-mingled at the molecular level within the coating, whereby the coatings are very uniform in composition, except for the variations intentionally produced by varying the relative rates of which the several vapors are generated. Additionally, the coatings are mechanically strong. The substitution of gradual changes in composition for abrupt interfaces between discrete layers substantially eliminates prior art problems of blistering, peeling, and the like, caused by poor adherence between adjacent layers.

The foregoing and other aspects of the invention may be better understood from the following illustrative description and the accompanying drawings.

FIGURE 5 is a schematic representation of vacuum evaporation apparatus for evaporating and depositing two chemical compounds simultaneously to form a single coating.

Figure 1:
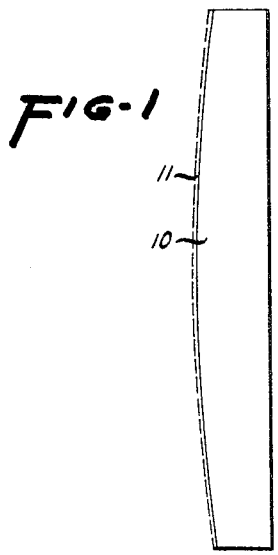
FIGURE 1 is a section of a lens coated with a uniform dielectric coating comprising a mixture of two chemical compounds, the thickness of the coating being exaggerated for clarity of illustration.

Referring to FIGURE 1 of the drawings, one embodiment of this invention may be seen to be comprised of a substrate consisting of a lens 10 and a homogeneous optical coating 11 applied, for example, by the method hereinafter described and having a heretofore unobtainable index of refraction. This single coating 11 is synthesized from a plurality of dielectric materials with known dielectric properties and has dielectric properties which were previously unobtainable. For example, the improved coating may have a refractive index which no other substance possesses. Thus, a single, improved coating 11 with the same or more desirable transmission characteristics than certain conventional multi-layer coatings, may be used in many instances to replace conventional multi-layer coatings. In addition, design and fabrication are quite simple and costs of production minimized.

Figure 2:
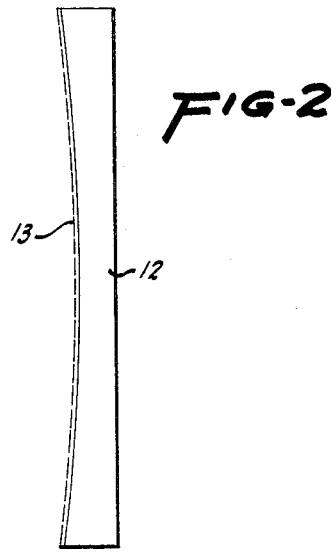
FIGURE 2 is a section of a mirror coated with a uniform dielectric coating comprising a mixture of two or more chemical compounds, the thickness of the coating being exaggerated, as above.

In FIGURE 2 another preferred embodiment may be seen to comprise a substrate 12 consisting of a metallic or other reflecting surface with a single homogeneous coating 13 thereon formed of a combination of dielectrics. In this case, the reflective coating 13 provides enhanced reflection, rather than optimum transmission characteristics, as in the embodiment of FIGURE 1. Again, a simpler, less expensive reflecting surface is available by synthesis.

Either of these optical surfaces may be manufactured by the method of this invention. In this method, vacuum deposition of various types of coating is accomplished by evaporating a first substance through electron beam bombardment of the substance to heat and vaporize the same. A second substance is also evaporated in the same manner, and these two substances are positioned to provide for co-mingling of their respective vapors. The substrate to be coated is then placed in the path of the co-mingled vapors, so that the co-mingled vapor mixture condenses upon the substrate, depositing a single-layer coating which is a homogeneous mixture of the two materials vaporized. The proportions of each substance in the vapor is controlled by controlling the electron energy of the electron beam and thereby controlling the evaporation rate of each vapor source. Any number of sources may be employed, and a separate substance evaporated from each.

In producing either optical surface shown in FIGURE 1 or 2, the method of the present invention greatly simplifies the design of the various coatings, for there is produced a single homogeneous coating of intermediate refractive value. Such a coating is suitable to replace conventional multi-layer coatings for many applications. In addition, the design of conventional multi-layer filters is greatly simplified, hereby, because any one layer in the multi-layer stack may now contain a synthesized dielectric material with a heretofore unattainable refractive value. For example, if magnesium chloride, with a refractive index of 1.38, is used as one substance and titanium dioxide, with a refractive index of 2.4, is used as the other substance, the resulting synthesized single layer coating may have a homogeneous refractive index of any intermediate value between 1.38 and 2.4. The actual value of the index is determined by the proportions of the separate substances deposited. Thus, the designer is provided with a new range of choices in selecting a refractive index, so as to attain a much greater flexibility, both in design of the single layer homogeneous coatings, and in the design of conventional multi-layer coatings.

Figure 3:
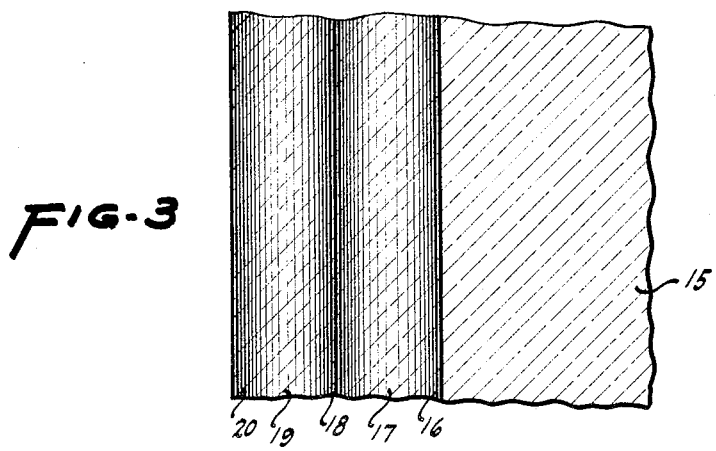
FIGURE 3 is a greatly enlarged fragmentary section of an optical filter embodying principles of this invention.

Referring to FIGURE 3, another preferred embodiment is illustrated, in section, as including a substrate 15, which may be a lens or a reflecting surface. The substrate is coated with a plurality of coatings 16, 17, 18, 19 and 20, collectively designed to provide either optimum transmission or enhanced reflection characteristics. The darker shaded areas 16, 18, and 20 are alternative zones of higher indexed material, and the lighter areas 17 and 19 represent zones containing material with a lower index of refraction. Unlike conventional optical surfaces, this invention possesses a multitude of continuous layers, in the order of molecular dimensions, without abrupt changes in the value of the refractive indexes between the various layers. Thus, the improved optical coating possesses a refractive value varying as a continuous function of the depth of the coating.

Figure 4:
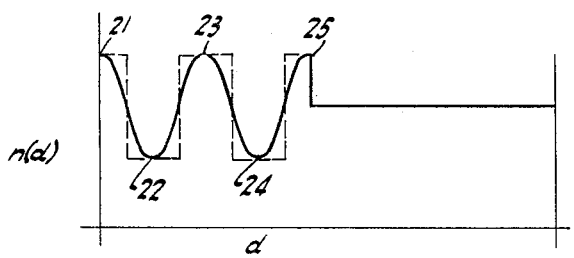
FIGURE 4 is a graph showing variations of the refractive index as a function of depth within the coating of the filter illustrated in FIGURE 3.

There is shown in FIGURE 4 a graph illustrating variations of the refractive index as a function of a depth within the coating of the filter shown in FIGURE 3. The solid line on the graph starts at a high point 21 at the left, representative of the index $n(d)$ of the zone 20, and curves downward to a point 22, representing $n(d)$ at the center of the zone 19. It will be seen that $n(d)$ varies smoothly between points 21 and 22, as the refractive index changes continuously with no abrupt drop in value. The index then continuously rises to a peak value at point 23, drops to an ebb value at point 24 and rises to another peak value at point 25, where an abrupt change in $n(d)$ occurs on reaching the surface of the lens. The dotted line is a plotted function of the refractive values for a conventional multi-layer lens showing the abrupt changes in value which would occur between points 21, 22, 23 and 24 had there been a discontinuity in refractive value at each conventional interface, as is the case in a conventional multi-layer lens coating.

The improved lens, shown in FIGURE 3 as one embodiment of the present invention and having a multi-layer coating with non-abrupt interfaces and continuous refractive value, may be produced by the same method, as described above. Two substances are simultaneously evaporated in a vacuum, as by directing an electron beam onto the surface of each substance. The substances are positioned so that their vapors co-mingle, and a substrate is placed in a position so that the co-mingled vapors deposit thereon, forming the desired coating. The energy of the separate electron beams is then varied to change the rate of deposition of each substance depositing on the substrate. Thus, in making the lens shown in FIGURE 3, for example, titanium dioxide may be heated to produce vapor from a first vapor source at a desired rate. A second vapor source, vaporizing magnesium chloride, for example, is then energized, slowly at first and more rapidly later on. Simultaneously, the first vapor source is gradually de-energized with a resulting decrease in its vapor emission until no vapor is produced thereby. The foregoing may then be reversed to create a coating exhibiting a smoothly varying dielectric property from 2.4 to 1.38 and back again without abrupt, step-like changes in the value of $n(d)$. This process may be repeated to produce as many layers as desired, and in the embodiment shown in FIGURE 3, the energy was evenly varied at the same rates. Any desired energy variation rates may be employed which will provide a coating which satisfies the desired boundary conditions of Maxwell's equations. In this manner, there is produced a coating with no abrupt interfaces between layers, with improved optical characteristics, and with a continuous function of refractive index versus distance through the thickness of the coating.

Certain variations in the method hereof are possible, and one alternative for producing the same filter is provided by setting the electron energy for each source at a predetermined constant value. The two sources are positioned so that their respective vapors overlap only partially, and the vapors emitted from the sources, in the form of vapor beams, mix only partially. The substrate is then passed through the pure vapor beam from the first source, through the mixed vapor beam, and then through the pure vapor beam from the second source, receiving vapor first from one, then both, and then from the second source. By reversing directions repeatedly, numerous coatings free from discontinuous interfaces may again be provided. Again any number of vapor sources may be used in the last mentioned method. Also, in using the last method, a long line of sources, with the different substances alternately arranged, allows multiple coating with one pass of the substrate, saving considerable motion and time and greatly reducing production costs. This is highly advantageous for mass production.

There is illustrated in FIGURE 5 one preferred embodiment of apparatus for carrying out the method of this invention. Inasmuch as a plurality of identical vapor sources and other related apparatus are shown, like elements are designated with like numerals followed by a "prime" (') symbol. Referring now to the apparatus, a housing 40 defines a vacuum chamber 41 which is continuously evacuated by high speed pumping means 42. Within the chamber 41 there is disposed a substrate 43 which is mounted above the vapor sources therein by any suitable mounting means 44. Since substrate 43 is to receive the applied coating, it is suspended over a plurality of crucibles containing the molten coating materials.

For the purpose of illustration, there are shown two vapor sources 46 and 46' and, as these sources may be identical, only one is described below. While a wide variety of different vapor sources may be utilized herein, there is shown a source 46 including a crucible 47 adapted to contain a material 48 to be vaporized. The material in the crucible is heated by electron bombardment through the open top of the crucible, and for this purpose there is provided an electron source directing a beam 51 into the crucible. Electrons are emitted from a filamentary cathode 52 and accelerated by a relatively positive potential upon the accelerating anode structure 53. The beam is preferably generated below the top of the crucible for protection of the cathode from vapor deposition and ion bombardment, and the beam 51 is magnetically focused to traverse an arcuated path into the crucible, as shown.

Energization of the vapor source may be accomplished by connecting the source cathode 52 across the secondary of a transformer 54, which has the primary winding connected to an autotransformer 56, that is in turn energized by an alternating current. The accelerating potential is provided by electrically grounding the accelerating anode structure 53 and maintaining the cathode at a high negative potential. Such a negative potential is obtained by connecting the variable tap of the secondary winding of transformer 54 to the negative output of a rectifier 57. The positive terminal of this rectifier is grounded and the rectifier 57 is transformer-coupled to a source of alternating current through a variable autotransformer 58. The magnetic focusing field is established between the pole pieces on opposite sides of the electron source; and an electromagnet 61 between these pole pieces is energized by direct current from a rectifier 62. Alternating current is applied to this latter rectifier 62 through a variable transformer 63.

With the foregoing circuitry, the electrons emitted from cathode 52 are accelerated by the relatively positive potential of the accelerating element 53 to form a beam 51. The magnetic field, directed into and perpendicular to the plane of the drawing by electromagnet 61, will bend the beam 51, as illustrated in the drawing. The electron beam 51 is focused upon the dielectric material 48 in crucibles 47. When the electron or the accelerating potential rate of electron emission is increased or decreased, the magnetic field strength is varied, by adjusting the transformer 63 to maintain beam 51 bombarding the surface of dielectric material 48. Field strength, rate of electron emission from cathode 52, and the accelerating potential are controlled by the settings of transformers 63, 56 and 58, respectively, thereby providing a convenient means for supplying any quantity of electron energy to the surface of the dielectric material in crucible 47 and facilitating highly accurate control of the evaporation process and the resultant rate of deposition on substrate 43.

Substrate 43 is placed at a sufficient distance above the plurality of sources 46 and 46', so that vapor emitted from one or any of the crucibles reaches any point on the under surface of substrate 43. By using dielectric substances of known refractive properties and by varying the power of the electron sources so that a desired amount of dielectric material is vaporized from the separate crucibles, a single coating may be applied to substrate 43 with a dielectric value intermediate between those of the separate coating substances. For example, as mentioned above, a titanium dioxide-magnesium chloride combination may be employed, providing a simple homogeneous coating posssessing dielectric properties between the properties of both with a heretofore unattainable refractive index. Alternatively, this coating may be one of many, in series of quarter wave stacks in a conventional multi-layer coating with definite interfaces. In either case, the overall design problem will be greatly simplified, because of the greater versatility and utility of the method and apparatus described herein.

In addition to the foregoing, multi-layer coatings without abrupt interfaces may be formed in the following manner with the apparatus of FIGURE 5. Vapor source 46 is energized so that the substance in the crucible 47 evaporates and deposits on the substrate 43. Following a predetermined period of evaporation from source 46, source 46' is energized, so that the electrons from electron beam 51' now strikes the surface of the material 48' contained in crucible 47' to heat and vaporize the material. Vapor then rises from source 46' and deposits on the substrate. Simultaneous operation of the sources continues for a prescribed period while the power supply of source 46 is gradually shut down, leaving the dielectric material from source 46' as the only material plating onto substrate 43. The application and withdrawal of power to and from each vapor source may be constant or it may vary according to a variable function designed to satisfy complex boundary conditions imposed by Maxwell's equations. If more layers are desired, this process is repeated, and in this manner a large number of layers may be applied to substrate 43 to provide an optical filter with multi-layer coatings but without interfaces having abrupt changes in the refractive values between said coatings. These coatings are of varying refractive values and their thickness is measured in molecular dimensions.

The same apparatus may also be employed to deposit coatings without varying the rates of vapor generation to obtain the same results, i.e., a graded coating. Sources 46 and 46' are separated sufficiently so that the vapors rising from each crucible will not overlap, except along a calculated distance midway between said crucibles. Substrate 43 is then passed over the crucibles, for example from left to right, receiving vapor first from source 46, then from both sources, and then only from source 46'. The substrate may then be moved in a reverse direction, if desired, to provide a coating having discrete layers without sharply varying characteristics between successive materials. Thus, with this modification, the apparatus may be used with alternative process steps to produce the new multi-layer coatings, and in either case, instead of producing a group of discrete layers similar to lumped constants in electrical circuits, there will be produced at a graded optical surface with a continuous change in refractive values, similar to an electrical circuit with a distributed constant. Again, this invention greatly simplifies the problem of designing complex filters formerly limited by the few suitable dielectric materials with known refractive values. Complex filter characteristics, which were heretofore difficult or impossible to achieve in practice, are now readily attainable.

It should be noted that the individual elements of the apparatus described above are well known in the art, and may also be employed to apply conventional multi-layer coatings to substrates. For example, vapor source 46 may first be energized depositing a first coating upon substrate 43. After source 46 is shut down, vapor source 46' may be energized to apply a second conventional coating. However, it should also be noted that the combination described herein produces new, useful and unexpected results when employed in accordance with the method disclosed herein. In addition, the employment of the variable electron energy for the adjustable heat sources provides a new, and novel method for applying the type of coating exemplified herein.

It should be understood that this invention in its broader aspects is not limited to specific examples illustrated and described herein and the following claims are intended to cover all changes and modifications that do not depart from the true spirit and scope of this invention.

What is claimed is:

1. A method for the manufacture of an optical filter which includes a light filtering coating on the surface of an optical substrate comprising, vaporizing at least two materials having different refractive indexes by electron bombardment of the surfaces thereof in a high vacuum to form a vapor mixture of said materials, condensing said vapor mixture on the surface of an optical substrate to form a coating thereon, and controlling the intensity of the electron bombardment of the surface of said materials in order to control the composition of said vapor mixture.

2. A method for the manufacture of an optical filter which includes a light filtering coating on the surface of an optical substrate comprising, separately vaporizing at least two dielectric materials having different refractive indexes by electron bombardment of the surfaces thereof in a high vacuum, commingling the vapors of said materials to form a vapor mixture, varying the intensity of the electron bombardment of the surface of at least one of said materials to vary the composition of said vapor mixture, and condensing said vapor mixture on the surface of an optical substrate to form a multi-layer coating thereon, whereby an optical filter is provided which has a light filtering coating of varying refractive index.

3. A method for the manufacture of an optical filter which includes a light filtering coating on the surface of an optical substrate comprising, vaporizing a first dielectric material having a refractive index by electron bombardment of the surface thereof in a high vacuum, vaporizing a second dielectric material having a refractive index different from that of said first material by electron bombardment of the surface thereof in the high vacuum, commingling the vapors of said materials to form a vapor mixture, and thereafter controllably varying the intensity of the electron bombardment and vaporization rate of at least one of said materials to provide a vapor mixture of varying composition, and condensing said vapor mixture on the surface of an optical substrate to form a multi-layer coating thereon, whereby an optical filter is provided having a light filtering coating including a plurality of layers of gradually changing refractive indexes.

4. A method for the manufacture of an optical filter which includes a light filtering coating on the surface of an optical substrate comprising, vaporizing a first dielectric material having a refractive index by electron bombardment of the surface thereof in a high vacuum, separately vaporizing at a point spaced from said first material a second dielectric material having a refractive index different from that of said first material by electron bombardment of the surface thereof in the high vacuum, passing an optical substrate through the vapors of said first and second materials at a distance from the surface thereof such that only a portion of the vapors of said first and second materials become commingled before striking said substrate, and condensing said vapors on the surface of said substrate to form a multi-layer coating thereon, whereby an optical filter is provided having a light filtering coating including a plurality of layers of gradually changing refractive indexes.

References Cited by the Examiner

UNITED STATES PATENTS

| | | | |
|---|---|---|---|
| 2,633,427 | 3/1953 | Dimmick et al. | 117—106 X |
| 2,641,954 | 6/1953 | Scharf et al. | 117—106 |
| 2,746,420 | 5/1956 | Steigerwald | 117—106 |
| 2,764,956 | 10/1956 | Burnett et al. | 118—11 |
| 2,890,624 | 6/1959 | Widdop et al. | 88—106 |
| 2,920,002 | 1/1960 | Auwarter | 117—33.3 |
| 2,922,391 | 1/1960 | Olson et al. | 118—11 |
| 2,932,588 | 4/1960 | Frank | 118—49.1 X |
| 3,033,701 | 5/1962 | Wozniak | 117—106 |
| 3,042,542 | 7/1962 | Anders et al. | 117—33.3 |
| 3,046,936 | 7/1962 | Simons | 118—49.1 |
| 3,063,861 | 11/1962 | Sugarman et al. | 117—33.3 |
| 3,102,828 | 9/1963 | Courvoisier | 117—107 X |
| 3,151,208 | 9/1964 | Alpert | 88—106 |

FOREIGN PATENTS 882,174   7/1953   Germany.

WILLIAM D. MARTIN, *Primary Examiner.*

RICHARD D. NEVIUS, *Examiner.*

R. E. ZIMMERMAN, S. W. ROTHSTEIN,
*Assistant Examiners.*